INVENTOR.
WILLIAM J. RUSSELL
BY
Cauder & Cauder
HIS ATTORNEYS

INVENTOR.
WILLIAM J. RUSSELL
BY
*Candor & Candor*
HIS ATTORNEYS

INVENTOR.
WILLIAM J. RUSSELL
BY
HIS ATTORNEYS

United States Patent Office 3,386,064
Patented May 28, 1968

3,386,064
ELECTRICAL SWITCHING DEVICE AND PARTS THEREFOR OR THE LIKE
William J. Russell, Malvern, Pa., assignor to Robertshaw Controls Company, Richmond, Va., a corporation of Delaware
Filed Apr. 13, 1965, Ser. No. 447,710
14 Claims. (Cl. 337—313)

This invention relates to an improved electrical switching device as well as to improved parts for such an electrical switching device and the like.

In many applications for a control for an electrical switch it is imperative that switching noise be reduced to a minimum level. Where relatively high current circuits are being connected and disconnected by the switching device, the noise of a mechanical snap acting device is many times objectionable. To eliminate this noise problem the slow make and break or graduating type of electrical switching mechanism is resorted to in many cases.

However, the graduating type of electrical switching mechanism, in order to gain sensitivity as in a room temperature control or the like, must use relatively high lever ratios so as to maintain close temperature control. This high lever ratio is also very desirable so as to provide a high rate of contact separation so as to eliminate radio and TV interference due to contact frying or arcing at the moment of separation. In most electrical switching operations, the contacts of the switch on closing will form welds of varying strength. With the combination of high lever ratio and low power input, as from a thermostat sensing element, it can be seen that the breaking of those welds can be difficult and often results in quite wide swings of temperatures. The wide swings of temperature occur since a greater rise in temperature is required in order to get more power from the sensing element so that it can break the welds on the contacts. The temperature rise required to break the welds is above the normal set point of the control.

However, according to the teachings of this invention, an improved electrical switching device or the like is provided wherein a high ratio of sensing element input to contact movement is provided to give excellent contact separation rate when no welds exist between the contacts.

However, in the event of contact welding, the improved switching device of this invention has a high total shearing power ratio as well as the high lever ratio in normal operation thereof.

This is accomplished by having the control device of this invention slide one of the contacts relative to the other contact when a weld exists therebetween to shear the weld therebetween so that the movable contact can be subsequently moved directly away therefrom to give a good contact separation rate.

Accordingly, it is an object of this invention to provide an improved electrical switching device or the like having one or more of the novel features set forth above or hereinafter shown or described.

Another object of this invention is to provide improved parts for such an electrical switching device or the like.

A further object of this invention is to provide an improved method of contact separation, the method of this invention having one or more of the novel features set forth above or hereinafter shown or described.

Other objects, uses and advantages of this invention are apparent from a reading of this description which proceeds with reference to the accompanying drawings forming a part thereof and wherein.

While the various features of this invention are hereinafter described and illustrated as being particularly adaptable to provide an electrical switching device or the like, it is to be understood that the various features of this invention can be utilized singly or in any combination thereof to provide other control devices or the like.

Therefore, this invention is not to be limited to only the embodiments illustrated in the drawings, because the drawings are merely utilized to illustrate one of the wide variety of uses of this invention.

Referring now to FIGURES 1–4 an improved control device of this invention is generally indicated by the reference numeral 20 and can be readily utilized to control the flow of current to heating elements or the like in relation to a pre-selected temperature for the building or the like heated by the heating elements.

Figure 1:
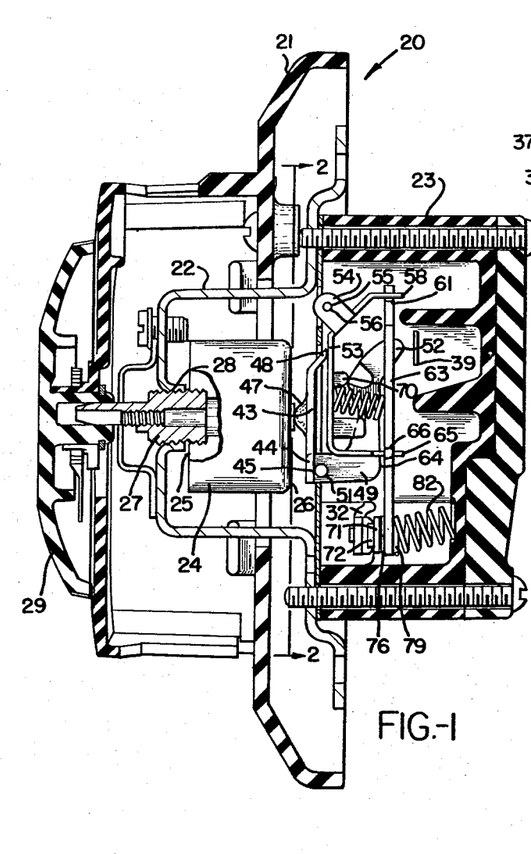
FIGURE 1 is a cross-sectional view illustrating one control device of this invention.
Figures 2, 3:
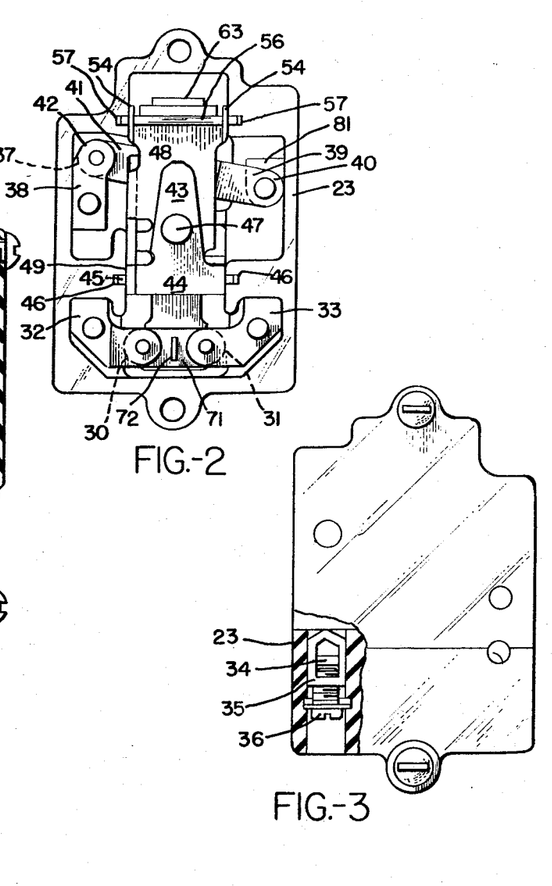
FIGURE 2 is a cross-sectional view taken on line 2—2 of FIGURE 1.
FIGURE 3 is a rear view of the control device illustrated in FIGURE 1.

In particular, the control device 20 of this invention includes a mounting plate 21 carrying bracket means 22 to which is secured a housing means 23 and an adjustable temperature responsive device 24.

In particular, the temperature responsive device 24 includes a fixed wall 25 and a movable wall 26 defining a chamber therebetween and in which the temperature responsive means is disposed so that when the temperature sensed by the temperature sensing means 24 increases, the movable wall 26 moves toward the right in FIGURE 1 and, conversely, when the temperature falls, the movable wall 26 moves to the left in FIGURE 1.

The fixed wall 25 of the temperature responsive device 24 is carried by a threaded member 27 threaded in an internally threaded portion 28 of the bracket 22, the threaded portion 27 being adjustable by a control knob 29 whereby the control knob 29 can select the desired temperature for the control device 20.

A pair of fixed contacts 30 and 31 are attached to terminal members 32 and 33 secured in the housing 23 by rivets or the like, each terminal member 32 and 33 having a projection 34 receivable in a lead connector 35 having a threaded member 36 rotatable in housing 23. Rotation of member 36 causes the connector 35 to move relative to the terminal extension 34 in the manner illustrated in FIGURE 3 so a lead placed in connector 35 can be secured against the terminal extension 34.

Another fixed contact 37 is carried by a terminal member 38 secured to the housing 23 in any suitable manner and being provided with the terminal extension 34.

A leaf spring 39 has one end 40 fastened to the housing means 23 and the other end 41 provided with a contact 42 cooperable with the contact 37, the spring blade 39 normally tending to maintain the contact 42 in contact with the fixed contact 37. The leaf spring 39 is interconnected to the terminal 81 having the terminal extension 34.

Figure 4:
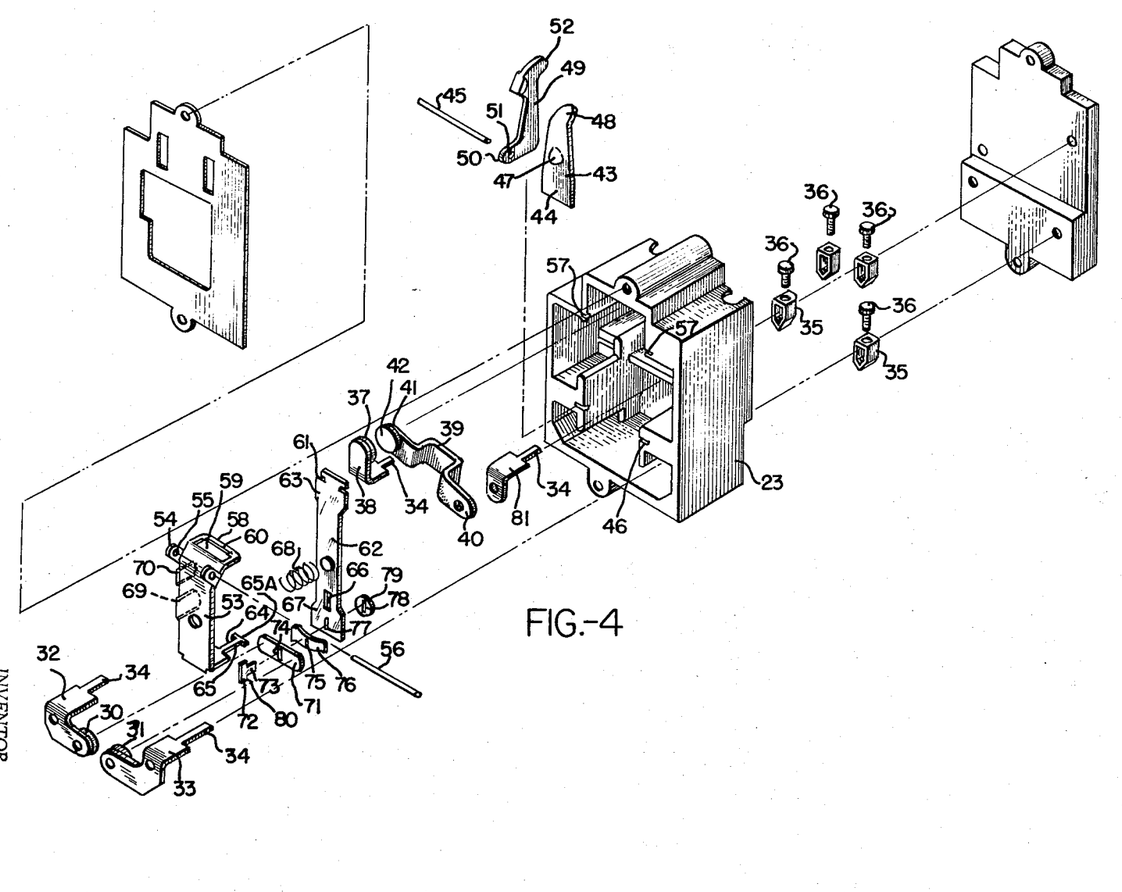
FIGURE 4 is an exploded perspective view of the various parts of the control device of this invention.
Figure 5:
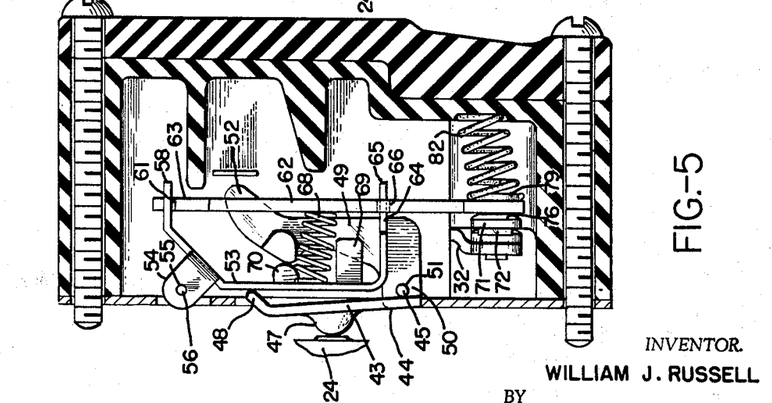
FIGURE 5 is an enlarged, fragmentary, cross-sectional view of a part of the apparatus illustrated in FIGURE 1 with the contacts in their closed position.

A lever 43 has an end 44 welded to a pivot pin 45 receivable in notches 46 in the housing means 23 in the manner illustrated in FIGURES 1 and 4, the lever 43 having an embossment 47 intermediate the end 44 and the end 48 thereof to be engaged by the movable wall 26 of the temperature responsive device 24.

Another lever 49 is provided and has an end 50 provided with an aperture 51 receiving the pivot pin 45 whereby the lever 49 is pivoted on the shaft 45. The other end 52 of the lever 49 is adapted to engage the spring blade 39 when lever 49 is rotated clockwise a sufficient distance in the manner and for a purpose hereinafter described.

A third level 53 is provided and has a pair of ears 54 respectively provided with apertures 55 to receive a pivot pin 56 having the ends thereof receivable in notches 57 formed in the housing means 23.

The lever 53 has an end 58 provided with a slot 59 having a reduced portion 60 to receive a reduced portion 61 of an insulated arm 62 whereby the end 58 of the lever 53 and the end 63 of the arm 62 are operatively interconnected together to move in unison in a manner hereinafter described. The lever 53 has another end 64 provided with a reduced portion 65 receivable in a slot 66 in the end 67 of the arm 62 in the manner illustrated in FIGURE 1. The end 65 of the lever 53 has an extension 65a thereon wider than the slot 66 so that a lost motion connection is provided between the lever 53 and the end 67 of the arm 62 for a purpose hereinafter described.

A compression spring 68 is disposed between the arm 62 and the lever 53 for a purpose hereinafter described.

The lever 53 has a bent over portion 69 which acts as a guide for pivotal movement of the lever 49 previously described. In addition, the lever 53 has a bent over tang 70 which is adapted to engage the lever 49 so that the lever 49 will be pivoted when the member 53 is pivoted in a manner hereinafter described.

A movable contact 71 is carried on the end 67 of the arm 62 by a rivet member 72 having a reduced portion 73 passing through a slot 74 in the contact 71, a slot 75 in a bowed leaf spring 76 and a slot 77 in the end 67 of the arm 62. In addition, the reduced portion 73 of the rivet 72 passes through a slot 78 in a retainer 79 disposed on the other side of the arm 62 whereby when the reduced portion 73 of the rivet is peened over, the same holds the members 72, 71, 76, 62 and 79 together while the leaf spring 76 tends to hold the contact 71 against the shoulder means 80 of the rivet 72.

However, the contact 71 is adapted to be moved toward the end 67 of the arm 62 by compressing the leaf spring 76 which with limited pivoting action about the apex of the spring 76 and the rivet 72 allows the contact 71 to position itself relative to the arm 62 within the limits of the rivet 72 so that the good conact is made with both contacts 30 and 31. The arm 62 can be formed from phenolic sheet material to insulate the contact structure for contact 71.

A compression spring 82 is disposed between the end 67 of the arm 62 and the housing means 23.

The operation of the control device 20 of this invention will now be described.

When the temperature responsive device 24 is sensing a temperature below the temperature selected by the control knob 29, the movable wall 26 of the temperature responsive device 24 is in such a position that the lever 43 permits the contacts 30 and 31 to be bridged by the contact 71 and the contacts 42 and 37 to be in electrical contact with each other whereby the heating elements for the building are energized to supply heat to the building and thus raise the temperature of the building to that selected by the control knob 29.

Figure 6:
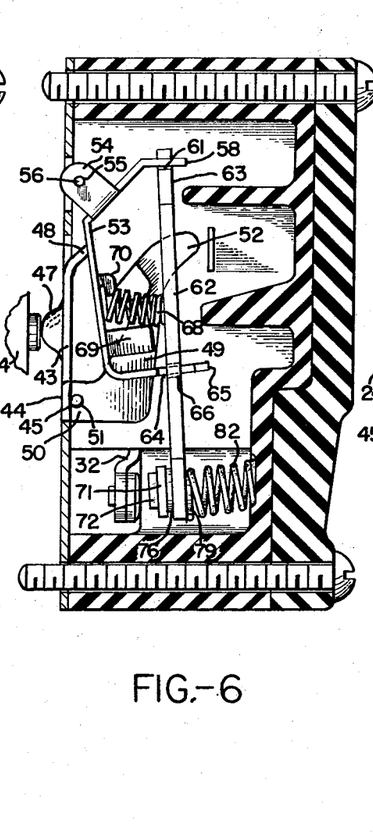
FIGURE 6 is a view similar to FIGURE 5 and illustrates the normal breaking of the contacts thereof.
Figure 7:
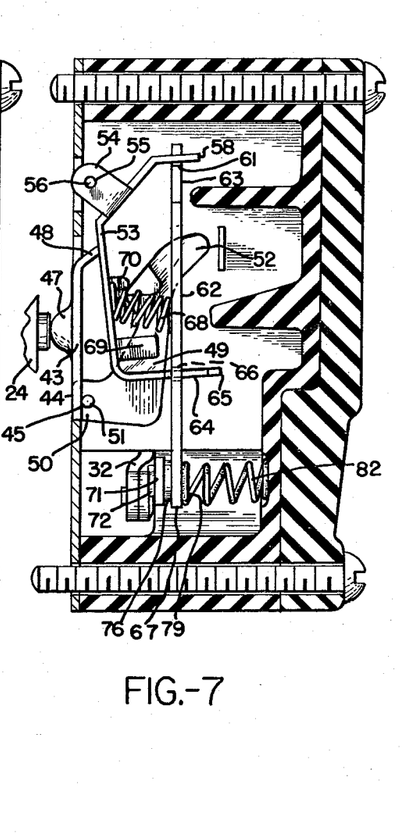
FIGURE 7 is a view similar to FIGURE 5 and illustrates the movement to break the weld between the contacts thereof.

When the temperature of the building is at or exceeds the selected temperature, the movable wall 26 of the temperature responsive device 24 has moved to the right in the drawings a distance sufficient to pivot the lever 43 in a clockwise direction to the position illustrated in FIGURES 6 or 7.

If no weld exists between the contact 71 and the contacts 30 and 31, the lever 53 is pivoted in a counterclockwise direction as illustrated in FIGURE 6 and the force of the compression spring 68 in opposition to the force of the compression spring 82 directly moves the arm 62 therewith so that the contact 71 is moved directly away from the contacts 30 and 31 to prevent electrical connection between the terminals 32 and 33 so that the energization of the heating elements can be terminated.

It can be seen that when such action takes place in FIGURE 6, a relatively high lever ratio of sensing element input to contact movement is provided to give excellent contact separation rate.

However, if a weld should exist between the contact 71 and the contact 30 and/or 31, the pivotal movement of the lever 53 in a counterclockwise direction in the manner illustrated in FIGURE 7 will merely compress the spring 68 as the end 67 of the arm 62 cannot move counterclockwise in unison therewith. However, the end 58 of the lever 53 has moved in a counterclockwise direction in such a manner that the same pulls the end 63 of the arm 62 therewith whereby the arm 62 and contact 71 slide relative to the contacts 30 and 31 to sever the weld therebetween as a high power ratio is provided by the lever arrangement. Once the weld has been severed in the above manner, the energy stored in the compressed spring 68 moves the arm 62 counterclockwise away from the lever 53 whereby the contact 71 will be moved away from the contacts 30 and 31 to the position illustrated in FIGURE 6.

Thus, it can be seen that the lever arrangement provided by the control device 20 is such that during a normal electrical switch breaking operation, the contact 71 moves directly away from the contacts 30 and 31. However, when a weld exists between the contact 71 and the contact 30 and/or 31, the contact 71 is moved with a sliding action relative to the contacts 30 and 31 until the weld therebetween is severed so that the contact 71 can, thereafter, be moved directly away from the contacts 30 and 31.

When the temperature sensed by the temperature sensing means 24 falls below the selected temperature, the movable wall 26 thereof moves to the left in FIGURE 1 a sufficient distance to permit the contacts 71 and 30, 31 to close under the force of the compression spring 82.

At the same time, the lever 53 is being pivoted in counterclockwise direction, regardless of whether the contacts 71 and 30 and 31 are welded together or not, the pivotal movement of the lever 53 causes the tang 70 thereof to pivot the lever 49 in a clockwise direction.

This movement of lever 49 which is thus set up is not sufficient to cause lever 49 to engage leaf spring 39 to move contact 42 out of electrical contact with contact 37 when the device is set within the operating range for the device. However, when the control is moved to its "off" position by the control knob 29, the temperature responsive device 24 is displaced to the right a sufficient distance to pivot lever 53 counterclockwise and engage lever 49 via tang 70 of lever 53 and cause lever 49 to be pivoted clockwise a sufficient amount to move contact 42 out of electrical contact with contact 37.

Therefore, it can be seen that this invention not only provides an improved control device having many novel features, but also this invention provides an improved method of making and breaking contacts so that the ratio of sensing element input to contact movement is relatively high to give excellent contact separation rate while providing a high ratio of shearing power should the contacts become welded together and when the contacts are welded providing means for storing energy for separating the contacts which is released when the contact weld is broken by the shearing action provided.

Figures 8, 10:
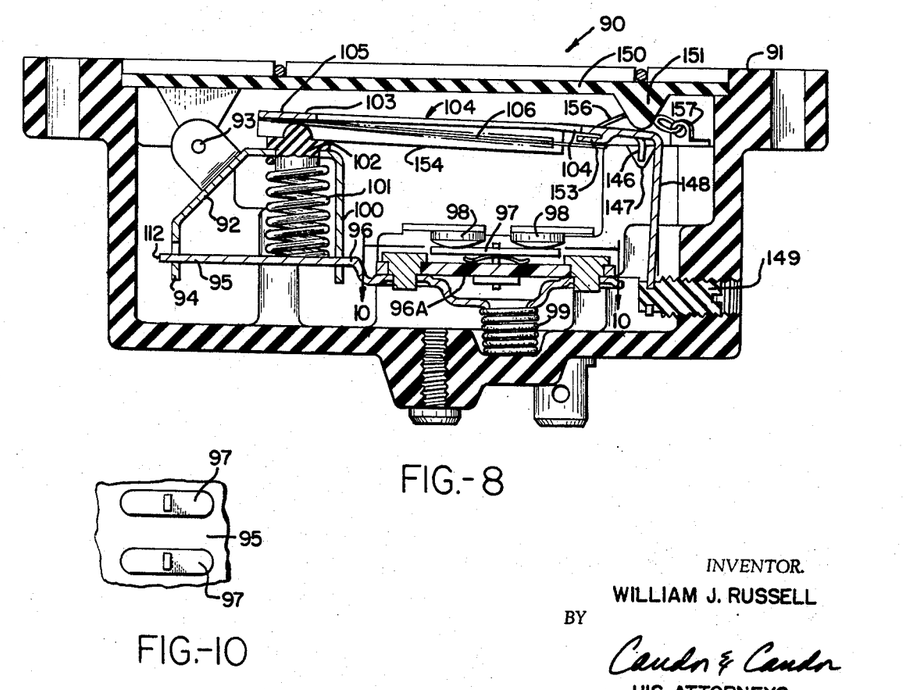
FIGURE 8 is a cross-sectional view illustrating another embodiment of this invention.
FIGURE 10 is a fragmentary cross-sectional view taken on line 10—10 of FIGURE 8.
Figure 9:
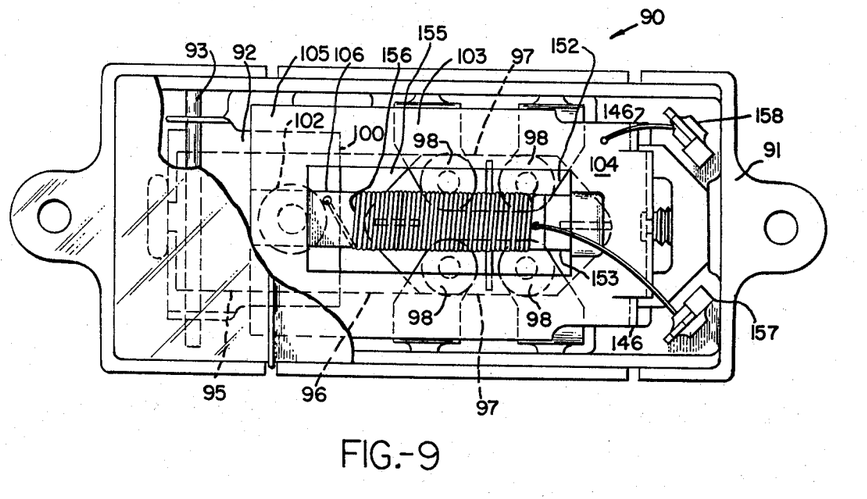
FIGURE 9 is a top view of the structure illustrated in FIGURE 8.

Referring now to FIGURES 8–10, another control device of this invention is generally indicated by the reference numeral 90 and comprises a heat motor operated double pole double break electrical switch.

In particular, the control device 90 includes a housing means 91 having a lever 92 pivoted therein on a pivot pin 93 carried by the housing means 91.

The lever 92 has an end 94 engaged with an end 95 of an insulated arm 96 in substantially the same manner as the arm 62 and the lever 53 previously described. The arm 96 includes a contact mounting base 96a of phenolic sheet material or other non-conducting material which carries a pair of contacts 97 each formed and mounted in the same manner as the contacts 71 previously described and two pairs of fixed contacts 98 carried by the housing means 91 with one pair positioned to be bridged by one of the contacts 71 and the other pair positioned to be bridged by the other contact 71.

The arm 96 is urged into its contact making position by a compression spring 99.

The other end 100 of the lever 92 has a lost motion connection with the arm 96 in the same manner as the end 64 of the lever 53 previously described. A compression spring 101 is disposed between the arm 96 and a retainer 102 carried by the lever 92.

A heat motor assembly 104 provides the means for actuating lever 92. In the embodiment shown in FIGURES 8–9, the heat motor includes an actuating arm 103 arranged for contacting at one end a non-conducting retainer 102 carried by lever 92 and is positioned at the other end by two downwardly extending tangs 146 positioned in a recess 147 formed in the housing means 91. The lever 92 includes a downwardly extending leg 148 which is coupled to an adjusting screw 149. The adjusting screw 149 is threaded into housing means 91 and can be adjusted from outside the housing means 91 and thus vary the operating or set point for the device. The cover 150 for the device has a downwardly extending portion 151 which is positioned above the arm 103 and the groove 147 to hold the heat motor assembly 104 in place.

The actuating arm 103 has a central rectangular opening 152. At the end of the opening adjacent the tangs 146 a tab 153 extends parallel to and below the arm 103 and in the direction of the opening. The tab 153 can be conveniently formed as an integral part of arm 103 as shown. The arm 103 is made with two downwardly extending flanges 154 formed at the edge of the arm 103. These extend from the end adjacent to lever 92 to a point short of the end of the opening 152 at the other end of arm 103. The arm 103 can therefore be flexed at the portion 104 adjacent the tab 153. During assembly of the heat motor assembly 104, the arm 103 is flexed downwardly when the expansion element or leg 106 which extends from tab 153 at one end of arm 103 to the other end of arm 103 is secured to the tab 153 and the other end of arm 103. The leg 106 can be secured by spot welding. A heater assembly 155 is formed on the leg 106 by wrapping nichrome wire 156 or securing any other suitable resistance heating element to leg 106. In the case of a resistance heater as shown, the wire is insulated from the leg 106 by sheets of mica or other non-conducting material. One end of the wire 156 is shown connected to a terminal 157. The other end of the wire may be secured directly to a second terminal 158 or as shown connected to leg 106. The circuit for the wire 156 in the latter case is completed by connecting a lead wire from arm 103 to terminal 158.

When the heater wire 156 is energized by an apprporite power source connected to terminals 157 and 158, the leg 106 is heated and lengthens allowing the arm 103 to move upward toward its unflexed position. The device is shown in FIGURE 8 when the heater wire 156 is energized in which case each contact 97 bridges its associated contact 98. When the heater wire is de-energized by the power source being removed from terminals 157 and 158, the leg 106 cools and contracts flexing the arm 103 downward so it acts on the lever 92 via retainer 102 to move the lever 92 clockwise by pivoting about pivot pin 93 whereby if no weld exists between the contacts 97 and stationary contacts 98, the compression spring 101 moves the arm 96 therewith to directly move the contacts 97 away from the contacts 98 in opposition to the force of the compression spring 99.

However, if a weld evists between the contacts 97 and stationary contacts 98, the spring 101 is compressed and the end 94 of the lever 92 carries the end 95 therewith so that the contacts 97 slide relative to the contacts 98 to sever the weld in the manner previously described whereby the energy stored in the spring 101 can, thereafter, move the contacts 97 away from the stationary contacts 98 in the manner previously described.

While the switching construction 90 has been illustrated as having the lever 92 pivoted to move the contacts 97 away from their associated contacts 98 when the heat motor is not energized to provide a fail safe arrangement for a circuit controlled via contacts 97 and 98, it is to be understood that the switch construction 90 could be so constructed and arranged that the contacts 97 are moved away from their associated contacts 98 as long as a current runs through the heater wire 156 so that if the current should cease to flow through the wire 156, the arm 103 would move upwardly allowing the contacts 97 to bridge their associated contacts 98 in a manner previously described.

Figure 11:
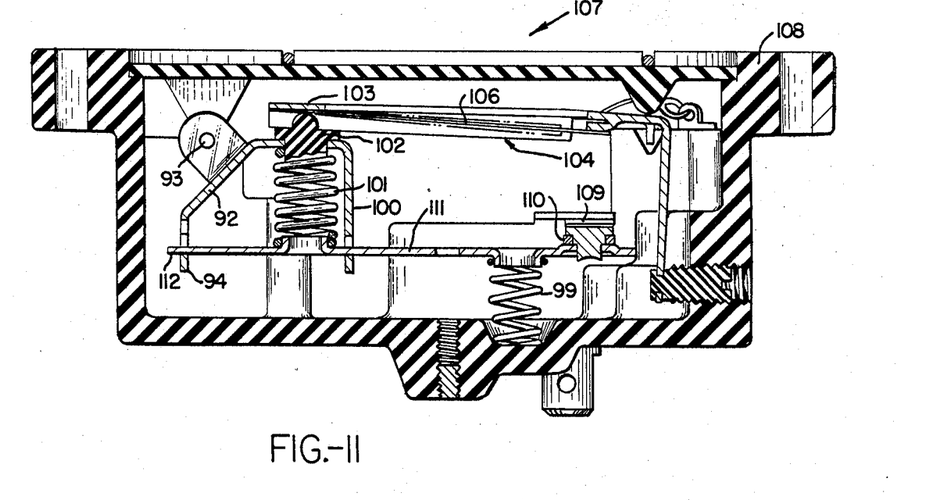
FIGURE 11 is a view similar to FIGURE 8 and illustrates still another embodiment of this invention.

Another electrical switching construction of this invention is generally indicated by the reference numeral 107 in FIGURE 11 and comprises a housing means 108 carrying a pair of stationary contacts 109 which are adapted to be bridged by a movable contact 110 carried on the arm 111 having its end 112 operatively interconnected to the pivotally mounted lever 92 previously described.

Thus, the electrical switching construction 107 illustrated in FIGURE 11 is a heat motor operated single pole double break switch which operates in the manner of the switch construction 90 previously described.

If desired, the switching constructions of this invention previously described can utilize a magnet in place of the compression springs 82 or 99 so as to act as a magnet detent or snap acting electrical switch construction.

Figure 12:
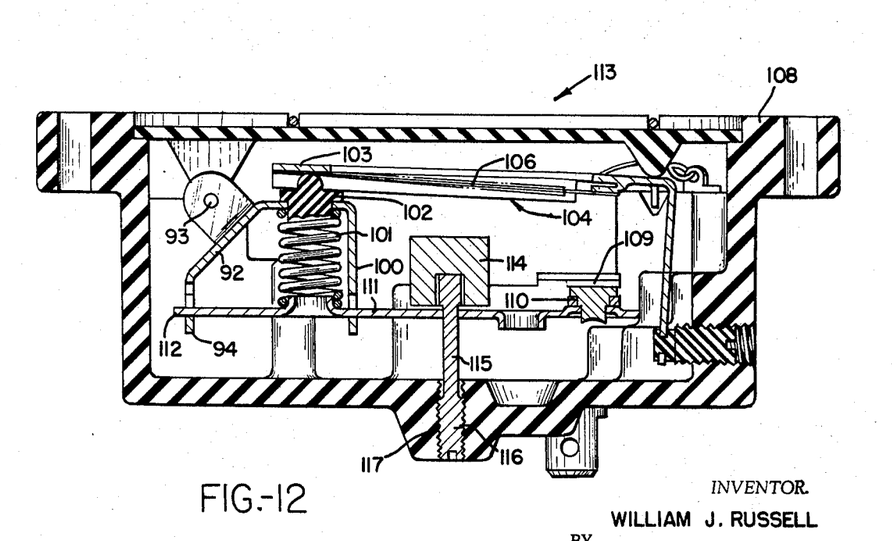
FIGURE 12 is a view similar to FIGURE 11 and illustrates another embodiment of this invention.

In particular, another switching construction of this invention is generally indicated by the reference numeral 113 in FIGURE 12 and parts thereof similar to the switching constructions 90 and 107 are indicated by like reference numerals.

However, the arm 111 is not biased upwardly to bridge the stationary contacts 109 with the contact 110 by the compression spring 99 previously described. Instead, a permanent magnet 114 is provided and is carried on a stem member 115 having a threaded portion 116 disposed in a threaded bore 117 of the housing means 108 whereby the position of the magnet 114 relative to the arm 111 can readily be adjusted.

When the force of the magnet 114 tending to hold the contact 110 in bridging relation with the contacts 109, is less than the force of the compression spring 101 when the lever 92 is initially pivoted in a clockwise direction, the contact 110 is moved directly away from the stationary contacts 109 in the manner previously described. When a weld exists between the contacts 110 and 109, the arm 111 and contact 110 slides relative to the contacts 109 to sever the weld in the manner previously described whereby the energy stored in the compression spring 101 will, thereafter, move the contact 110 away from the contacts 109 in the manner previously described.

However, should the force of the magnet 114 tending to hold the arm 111 in its contact closing position be stronger than the initial compression force of the spring 101 when the lever 92 is initially pivoted in a clockwise direction, it can be seen that the lever 92 must be further pivoted in a clockwise direction in order to have the force of the compression spring 101 overcome the force of the magnet 114 acting in opposition thereto whereby a snap acting arrangement is provided to snap the contact 110 out of engagement with the stationary contacts 109. Before the snap acting operation takes place, the arm 111 is moved axially to the left to provide a sliding action of the contact 110 relative to the contacts 109 as the lever 92 is being pivoted in a clockwise direction whereby a severing operation takes place regardless of whether a weld exists between the contacts 110 and 109 until the force of the compression spring 101 overcomes the force of the magnet 114 and accomplishes the snap acting movement of the contact 110 away from the contacts 109.

Figure 13:
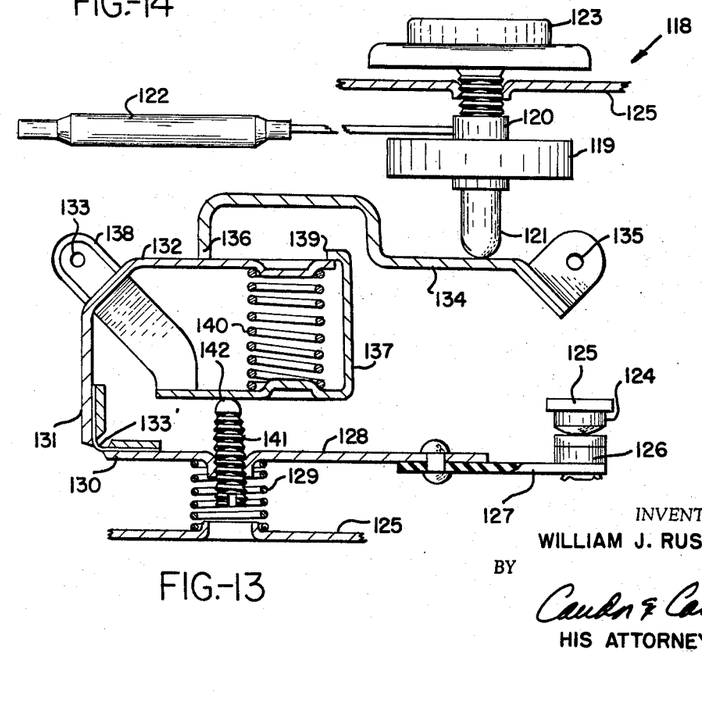
FIGURE 13 is a schematic cross-sectional view illustrating another embodiment of this invention.

Another switching construction of this invention is generally indicated by the reference numeral 118 in FIGURE 13 and includes a temperature responsive expansible element 119 having a fixed wall 120 and a movable wall 121 movable toward and away from the fixed wall 120 when a temperature sensing bulb 122 senses a change in temperature, the fixed wall 120 of the temperature responsive device 119 being adjusted by a control knob 123 to select a desired temperature for the device 118.

A fixed contact 124 is carried by a stationary frame means 125 and cooperates with a movable contact 126 carried on the end 127 of an arm 128 of non-conducting material normally biased into contact closing position by a compression spring 129 disposed between the arm 128 and the frame means 125.

The other end 130 of the arm 128 is interconnected to the end 131 of a pivotally mounted lever 132 by a flexible leaf spring 133', the lever 132 being pivoted about a pivot point 133 fixed to the stationary frame means 125.

Another lever 134 is pivoted to the stationary frame means about a pivot pin 135 and has an end 136 engageable with a lever 132 while the movable wall 121 of the temperature responsive device 119 is engageable with the lever 134.

A third lever 137 is provided and has an end 138 pivoted at the point 133 with another end 139 disposed over the lever 132, a compression spring 140 being disposed between the levers 132 and 137 to tend to hold the end 139 of the lever 137 into engagement with the lever 132 in the position illustrated in FIGURE 13.

An adjusting screw 141 is threadedly carried by the arm 128 and has an end 142 engageable with the lever 137.

The operation of electrical switching construction 118 will now be described.

As long as the temperature sensing bulb 122 senses a temperature below the temperature selected by the control knob 123, the movable wall 121 of the expansible element 119 is disposed in the position illustrated in FIGURE 13 whereby the contacts 124 and 126 are electrically connected together.

However, when the temperature sensed by the bulb 122 exceeds the temperature selected by the control knob 123, the movable wall 121 of the expensible element 119 moves downwardly to pivot the lever 134 in a counterclockwise direction whereby the lever 132 is pivoted in a clockwise direction. If no weld exists between the contacts 124 and 126, the force of the compression spring 140 moves the lever 137 in a clockwise direction in unison with the pivotal movement of the lever 132 and pivots the arm 138 in a clockwise direction by means of the leaf spring 133' in opposition to the force of the compression spring 129 and directly moves the contact 126 away from the contact 124.

However, should a weld exist between the contacts 124 and 126 when the lever 134 is pivoted in a counterclockwise direction, the lever 132 is pivoted in a clockwise direction and compresses the spring 140 as the lever 137 is held in the position illustrated in FIGURE 13 because the arm 128 cannot move in a clockwise direction because of the weld at the contacts 124 and 126. However, since the lever 132 is pivoting in a clockwise direction, the end 131 thereof moves in an arcuate path to the left in FIGURE 13 and carries the end 128 therewith whereby the arm 128 and contact 126 slide relative to the contact 124 to sever the weld therebetween. Once the weld between the contacts 124 and 126 has been severed in the above manner, the energy stored in the compressed spring 140 forces the lever 137 in a clockwise direction to move the arm 128 in a clockwise direction whereby the contact 126 is moved away from the contact 124 in substantially the same manner as when no weld exists between the contacts 124 and 126.

As previously set forth, the various lever arrangements of the electrical switch constructions of this invention are so constructed and arranged that the ratio of sensing element input to contact movement is relatively high when no weld rests between the contacts to give excellent contact separation rate. Further, should a contact welding situation exist between the contacts, the lever arrangements of the switching constructions of this invention are such that a total shearing power ratio is relatively high to break the weld.

In particular, taking the switching construction 118 as an example, it can be seen that lever 134 has a ratio between pivot point 135, contact point of the movable wall 121 of the expansible element 119 and the end 137 of the lever 134 equal to approximately 4 to 1. Contact arm 128 pivoting about pivot point 133 has a ratio to the contact bridge of approximately 4 to 1. Thus, the ratio of sensing element input to contact movement is approximately 16 to 1 which gives excellent contact separation rate.

In the event of the contact welding, the ratio of lever 134 remains approximately 4 to 1.

Since the contacts 124 and 126 are welded and the contact arm 128 cannot move downwardly, lever 132 has a ratio of approximately 1 to 1 between input and output at pivot point 133 to give a total shearing power ratio of approximately 4 to 1. Thus, it can be seen that the weld breaking or shearing power of the electrical switching construction 118 is high when required while in normal operation the lever ratio is also high.

For those applications where an extremely fast rate of contact separation, i.e., snap action, is required, the switching device 118 can be used with only one added element while retaining all the features of the device 118 whereby only a slight amount is added to the manufacturing cost thereof.

Figure 14:
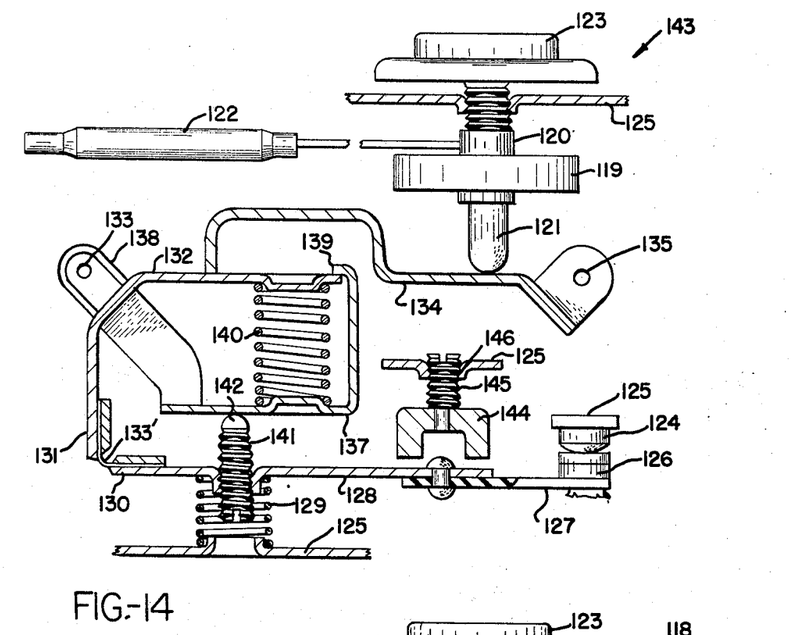
FIGURE 14 is a view similar to FIGURE 13 and illustrates another embodiment of this invention.

For example, reference is made to FIGURE 14 wherein another switching construction of this invention is generally indicated by the reference numeral 143 and parts thereof similar to the switching construction 118 are indicated by like reference numerals.

The only additional element added to the switching construction 143 to the switching construction 118 is a small permanent magnet 144 carried on a threaded adjusting member 145 threaded in a threaded bore 146 of the stationary frame means 125.

Since the force of spring 129 and the magnetic force of attraction between the magnet 144 and the contact from 128 is slightly greater than the force of the compression spring 140 in its at rest position as shown, lever 134 will cause the lever 132 to pivot about pivot point 133 in a clockwise manner compressing spring 140 until its force matches the combined force of the magnet 144 and spring 129 at which time the contact arm 128 will move to open the contacts with a very rapid snap action.

This magnetic snap acting type of switching mechanism 143 will have a differential that can be adjusted to zero as when the force of the spring 140 and the combined magnetic and spring force of the magnet 144 and spring 128 are equal to a wide differential as when the force of spring 140 is much less than the combined magnetic and spring force of the magnet 144 and spring 129.

This adjustment is made by varying the magnetic force by means of the adjusting member 145.

It can be seen that at any time there exists a spring vs. spring magnetic force differential in the switching construction 143, a snap action will take place. Also, in every cycle under these conditions there exists a weld shearing force or action as described in the prevous operating description in which a weld was in force at the contacts 124 and 126. Insofar as the lever system is concerned in the switching construction 143, it sees the magnetic force of attraction between the magnet 144 and the contact arm 128 as a welded contact situation and, thus, is operated so as to shear this weld even though it be non-existent.

Therefore, it can be seen that while the various switching constructions of this invention have many advantages, they each have low manufacturing costs, simplicity of assembly, prolonged contact and bridge life, high sensitivity, close temperature control, excellent weld breaking power, great reduction or elimination of radio and TV interference, and extremely low controlled temperature differential.

Further, in the switching constructions of this invention which have a permanent magnet utilized therein, it can be seen that the same have the advantages of having an adjustable differential, high sensitivity with snap action, excellent weld breaking force with snap action, and contact wipe built in to keep the contacts clean.

Accordingly, it can be seen that not only does this invention provide an improved electrical switch construction or the like, but also this invention provides an improved method of contact breaking or the like.

While the form of the invention now preferred has been disclosed as required by the statutes, other forms may be used, all coming within the scope of the claims which follow.

What is claimed is:

1. In combination, frame means, a fixed contact carried by said frame means, a movable contact for cooperating with said fixed contact, said contacts being disposed in engagement with each other to provide an electrical circuit between said engaged contacts, an arm carrying said movable contact, a lever pivoted to said frame means intermediate the ends of said lever, one end of said lever being connected to said arm, and spring means disposed between the other end of said lever and said arm, said lever when pivoted in one direction causing said spring means to move said arm and movable contact directly out of engagement and away from said fixed contact only when no weld exists between said engaged contacts, said lever when pivoted in said one direction sliding said arm and movable contact relative to said fixed contact while said contacts are in engagement only when a weld exists between said engaged contacts whereby the sliding action breaks the weld and said spring means can, thereafter, move said arm and movable contact directly out of engagement and away from said fixed contact.

2. A combination as set forth in claim 1 wherein said spring means has opposed ends respectively engaging said lever and said arm.

3. A combination as set forth in claim 1 wherein a second lever is pivoted to said frame means and engages said arm, said spring means having opposed ends respectively engaging said levers.

4. In combination, frame means, a fixed contact carried by said frame means, a movable contact for cooperating with said fixed contact, said contacts being disposed in engagement with each other to provide an electrical circuit between said engaged contacts, an arm carrying said movable contact, a first lever pivoted to said frame means intermediate the ends of said first lever, one end of said lever being connected to said arm, spring means disposed between the other end of said first lever and said arm, said lever when pivoted in one direction causing said spring means to move said arm and movable contact directly out of engagement away from said fixed contact only when no weld exists between said engaged contacts, said lever when pivoted in said one direction sliding said arm and movable contact relative to said fixed contact while said contacts are in engagement only when a weld exists between said engaged contacts whereby the sliding action brakes the weld and said spring means can, thereafter, move said arm and movable contact directly out of engagement away from said fixed contact, a second lever pivoted to said frame means and having an end engageable with said other end of said first lever, and a condition responsive means for pivoting said second lever to pivot said first lever.

5. A combination as set forth in claim 4 wherein a second fixed contact and a second movable contact are carried by said frame means, said first lever having means for moving said second movable contact away from said second fixed contact when said first lever is pivoted in said one direction.

6. In an electrical switch, a fixed contact, a movable contact for cooperating with said fixed contact, said contacts being disposed in engagement with each other to provide an electrical circuit between said engaged contacts, a first actuating means for moving said movable contact directly out of engagement and away from said fixed contact without any sliding engaged motion between the contacts only when no weld exists between said engaged contacts, and a second actuating means for first sliding said movable contact relative to said fixed contact while said contacts are in engagement only when a weld exists between said engaged contacts whereby the sliding action breaks the weld and said first actuating means can, thereafter, move said movable contact directly out of engagement and away from said fixed contact without further sliding engaged motion between the contacts.

7. In combination, a frame means, a fixed contact carried by said frame means, a movable contact for cooperating with said fixed contact, said contacts being disposed in engagement with each other to provide an electrical circuit between said enaged contacts, a movable member mounted to said frame member and carrying said movable contact, a first actuating means for moving said member and movable contact directly out of engagement and away from said fixed contact without any sliding engaged motion between the contacts only when no weld exists between said engaged contacts, and a second actuating means for sliding said member and movable contact relative to said fixed contact while said contacts are in engagement only when a weld exists between said engaged contacts whereby the sliding action breaks the weld and said first actuating means can, thereafter, move said member and movable contact directly out of engagement and away from said fixed contact without further sliding engaged motion between the contacts.

8. A combination as set forth in claim 7 wherein means tend to maintain said movable member in its contact closing position.

9. A combination as set forth in claim 8 wherein said last-named means comprises a compression spring.

10. A combination as set forth in claim 8 wherein said last-named means comprises magnet means.

11. A combination as set forth in claim 7 wherein said movable contact is movable relative to said movable member and is normally held in one position relative to said movable member by an interposed spring means.

12. In combination, frame means, a fixed contact carried by said frame means, a movable contact for cooperating with said fixed contact, said contacts being disposed in engagement with each other to provide an electrical circuit between said engaged contacts, a movable member mounted to said frame means and carrying said movable contact, first actuating means for moving said member and movable contact directly out of engagement and away from said fixed contact without sliding engaged motion between the contacts only when no weld exists between said engaged contacts, and second actuating means for sliding said member and movable contact relative to said fixed contact while said contacts are in engagement only when a weld exists between said engaged contacts whereby the sliding action breaks the weld and said first actuating means can, thereafter, move said member and movable contact directly out of engagement and away from said fixed contact without further sliding engaged motion between the contacts, said means including a condition responsive device.

13. A combination as set forth in claim 12 wherein said condition responsive device comprises as expansible element.

14. A combination as set forth in claim 12 wherein said condition responsive device comprises a heat motor.

References Cited

UNITED STATES PATENTS

| | | | |
|---|---|---|---|
| 2,625,630 | 1/1953 | Eckles | 200—166 X |
| 3,147,352 | 9/1964 | Giessner | 200—116 |
| 1,796,449 | 3/1931 | Getchell | 200—164 |
| 1,864,369 | 6/1932 | Pepper | 200—164 X |
| 2,315,960 | 4/1943 | Hottenroth | 200—83.9 |
| 2,634,174 | 4/1953 | Gille | 200—67 |
| 2,755,362 | 7/1956 | Jacobs | 200—14 |
| 3,197,595 | 7/1965 | Weber | 200—14 |

BERNARD A. GILHEANY, *Primary Examiner.*

H. B. GILSON, *Assistant Examiner.*